US011714183B2

(12) United States Patent
Leong et al.

(10) Patent No.: US 11,714,183 B2
(45) Date of Patent: Aug. 1, 2023

(54) IMPULSE RADAR USING VARIABLE PULSE REPETITION FREQUENCY

(71) Applicant: NXP B.V., Eindhoven (NL)

(72) Inventors: Frank Leong, Veldhoven (NL); Xin He, Waalre (NL)

(73) Assignee: NXP B.V., Eindhoven (NL)

(*) Notice: Subject to any disclaimer, the term of this patent is extended or adjusted under 35 U.S.C. 154(b) by 463 days.

(21) Appl. No.: 16/558,478

(22) Filed: Sep. 3, 2019

(65) Prior Publication Data
US 2021/0063562 A1 Mar. 4, 2021

(51) Int. Cl.
G01S 13/76 (2006.01)
G01S 7/282 (2006.01)
G01S 13/12 (2006.01)

(52) U.S. Cl.
CPC ............ G01S 13/76 (2013.01); G01S 7/282 (2013.01); G01S 13/12 (2013.01)

(58) Field of Classification Search
CPC ........ G01S 13/76; G01S 13/12; G01S 13/931; G01S 13/16; G01S 7/282; G01S 7/292
See application file for complete search history.

(56) References Cited

U.S. PATENT DOCUMENTS

| 9,891,311 | B2 | 2/2018 | Leong et al. | |
|---|---|---|---|---|
| 10,175,340 | B1* | 1/2019 | Abari | G06K 9/00805 |
| 2012/0235857 | A1* | 9/2012 | Kim | G01S 13/345 342/134 |
| 2014/0240691 | A1* | 8/2014 | Mheen | G01S 7/4818 356/4.07 |
| 2015/0285897 | A1* | 10/2015 | Kilty | G01S 7/28 342/201 |
| 2016/0084943 | A1* | 3/2016 | Arage | G01S 13/42 342/102 |
| 2017/0276770 | A1* | 9/2017 | Lin | H01Q 21/061 |
| 2017/0293017 | A1* | 10/2017 | Evangelista | G01S 7/032 |
| 2018/0314253 | A1* | 11/2018 | Mercep | G06K 9/6289 |
| 2019/0137601 | A1* | 5/2019 | Driscoll | G01S 13/931 |
| 2019/0212438 | A1* | 7/2019 | Kim | G01S 7/411 |
| 2021/0063562 | A1* | 3/2021 | Leong | G01S 7/292 |
| 2021/0156978 | A1* | 5/2021 | Nicholls | G01S 7/024 |

OTHER PUBLICATIONS

Obeid et al., "Millimeter Wave Ultra Wide Band Short Range Radar Localization Accuracy", 69th Vehicular Technology Conference, Apr. 26, 2009, pp. 1-5.
Leong et al., "HRP UWB SRDEV PPDU Text Contribution," IEEE P802.15-18-0286-01-004z, Jul. 5, 2018; 17 pages.

* cited by examiner

*Primary Examiner* — Donald H B Braswell

(57) ABSTRACT

An apparatus including a transmitter including a pulsed Radio Frequency (RF) source coupled to an antenna. A receiver includes an amplifier coupled to the antenna. A controller is configured to adjust one or more durations of a ranging cycle of the apparatus, wherein the ranging cycle includes a first duration of a gated mode and a second duration of a non-gated mode. The gated mode blinds the amplifier during a transmission of the transmitter. The non-gated mode reduces a gain of the amplifier during the transmission.

21 Claims, 6 Drawing Sheets

IMPULSE RADAR USING VARIABLE PULSE REPETITION FREQUENCY

FIELD

This disclosure relates generally to radar systems, and more specifically to an impulse radar having both long-range and short-range detection capability.

BACKGROUND

RF ranging systems employ a Time-Of-Flight (TOF) principle to determine a distance between a transmitter and a target. Typically, a transmitter transmits a waveform towards the target. The waveform is then reflected or retransmitted by the target towards a receiver. The duration of time for the reflection or retransmission to reach the receiver, determines the distance between the transmitter and the target.

Examples of targets include distant targets, with relatively weak reflectivity, and nearby targets, which reflect a stronger signal towards the receiver. Monostatic radars combine the transmitter and receiver antennas to reduce a cost of an RF ranging system. However, monostatic radars have not been able to operate in both long-range and short-range modes, thus limiting their application.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for a pulsed radar system alternatively operating in both a long-range (e.g., gated mode), and a short-range (e.g., non-gated mode). In the long-range mode, receiver blindness is supported for higher available Signal to Noise Ratio (SNR). In the short-range mode, the receiver detects target reflections or retransmissions overlapping with a direct feed-through signal from the mono-static transmitter to the receiver. Accordingly, the pulsed (e.g., impulse), radar systems described herein offer cost competitive detection of both short-range and long-range targets, as well as a dynamic means to tune operating modes of the radar system based on a combination of target characteristics.

Figure 1:
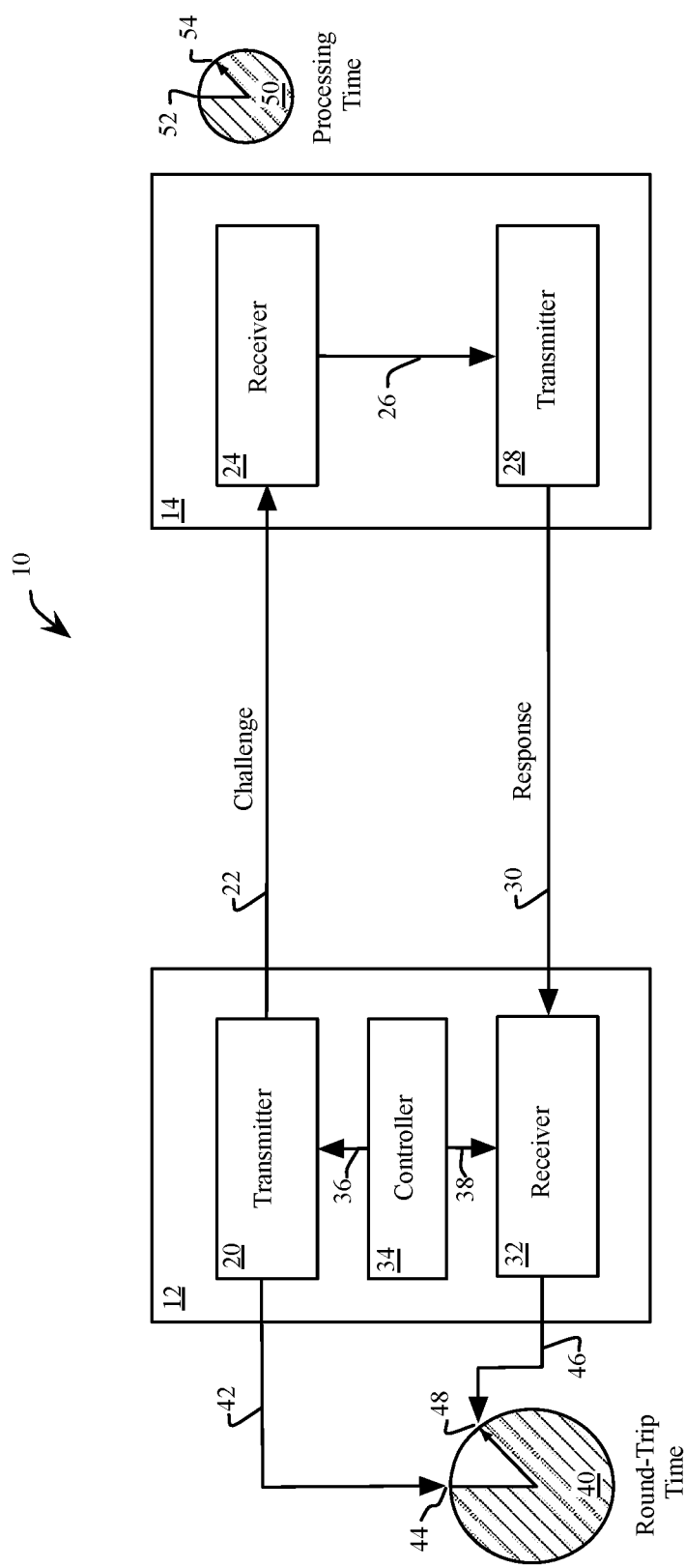
FIG. 1 is a schematic view of an example embodiment of a Radio Frequency (RF) ranging system.

FIG. 1 shows an example embodiment 10 of an RF ranging system, wherein a target retransmits a received waveform from a radar. It should be appreciated that the teachings of this disclosure apply to both monostatic radars having a collocated transmitter and receiver, and bistatic radars having a transmitter and receiver having a substantial separation therebetween. Furthermore, this disclosure is contemplated to be implemented in either monostatic or bistatic radar embodiments with either passive targets (e.g., reflecting a received signal), or active targets (e.g, actively retransmitting the received signal). The embodiment 10 employs the TOF principle to determine a distance between two objects, or markers on objects. Specifically, the embodiment 10 includes a radar 12 and a target 14. The radar 12 transmits, with a transmitter 20, a waveform (e.g., a chirp or a pulse) over a path 22 to a receiver 24. The waveform travels across the path 22 as a "challenge" to the target 14 and with an elapsed transit time equal to "TOF-1." The receiver 24 transfers a request over a net 26 to a transmitter 28, with an elapsed processing time equal to "Tproc." The transmitter 28 transmits a second transmission over a path 30 to a receiver 32 of the radar 12. The second transmission is a "response" to the challenge of the radar 12 and transits the path 30 with a transit time equal to "TOF-2."

A controller 34 controls the operations of the transmitter 20 and the receive 32 over respective nets 36 and 38. Specifically, the controller initiates a transmission from the transmitter 20, and starts the calculation of the distance between the radar 12 and the target 14 with a Round-Trip Time of Flight ("RTToF") counter 40. The transmitter 20 starts the counter 40 with a start request on net 42 to establish a start time 44. The receiver 32 stops the counter 40 with a stop request on net 46 to establish a stop time 48. The time difference between the start time 44 and the stop time 48 is a measured time (Tmeas). Similarly, the target 14 measures a processing time (Tproc) with a counter 50, by measuring a time difference between a time 52, when the receiver 24 receives the waveform from the transmitter 20, and a time 54, when the transmitter 28 transmits the second waveform to the receiver 32. Accordingly, the distance (D) between the radar 12 and the target 14 is given by the following equation (1), wherein "c" is the speed of light in the medium comprising the paths 22 and 30.

$$D = (TOF\text{-}1 + TOF\text{-}2) * c/2 = (T\text{meas} - T\text{proc}) * c/2 \quad \text{Equation (1)}$$

Figure 2:
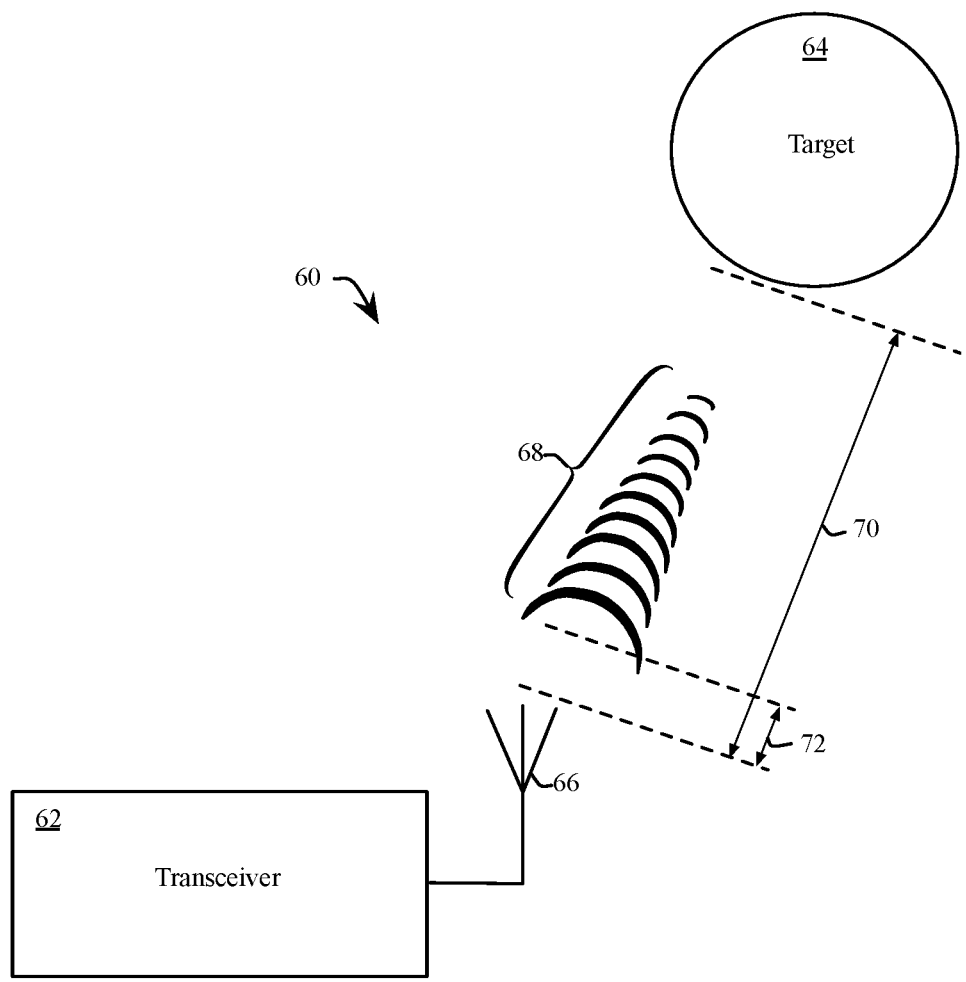
FIG. 2 is a schematic view of an example embodiment of a monostatic pulsed radar system.

In another embodiment, wherein the target 14 passively reflects the waveform transmitted by the transmitter 20, the processing time Tproc is zero, hence in equation 1. In example embodiments of a radar based on an Impulse-Radio Ultra-Wide Band ("IR UWB") protocol based on IEEE 802.15.4 High Rate Pulse (HRP) repetition frequency UWB operating between approximately 3 GHz and 10 GHz, the radar transceiver operates either as a bistatic or a monostatic radar. FIG. 2 shows an example embodiment 60 including a transceiver 62 and a target 64. The embodiment 60 is configured as a monostatic radar, wherein a collocated transmitter and receiver form a transceiver 62. In one embodiment, the transceiver 62 includes a transmitter and a receiver having respective antennas in close proximity. In another embodiment, the transmitter and receiver share the same antenna 66, the reduce the cost of the RF ranging system.

In the embodiment 60 of the monostatic radar, a pulse is transmitted by the transceiver 62 towards the target 64, and then a reflected pulse (e.g., second transmission) 68 is reflected by the target 64. A distance (or range) 70 between the transceiver 62 and the target 64 is calculated using the methods described for FIG. 1. For targets that are physically close to the transceiver 62, a radar blind range 72 exists, when the transceiver 62 transmits in a gated mode, because the reflected pulse 68 returns to the transceiver 62 while the receiving portion of the transceiver 62 is blinded. The term "blinded" in this context means that the receiver ignores received waveforms through one or more techniques, including but not limited to, deactivating an amplifier of the receiver, or gating an output of the amplifier.

In one example embodiment of a monostatic radar, as shown in FIG. 2, a relatively low-cost radar is implemented to perform functions such as (human) presence detection, respiration rate monitoring or heartbeat monitoring. As a specific case, where an IR-UWB radio is primarily used for vehicular access, a radar mode of an externally mounted transceiver allows the re-use of the same hardware to act as a parking sensor (e.g., to be used for autonomous remote parking). Similarly, in another embodiment, an internally mounted IR-UWB transceiver is used for in-cabin radar monitoring or gesture control in an automobile.

In embodiments of RF ranging systems, such as the one described in FIG. 1 and FIG. 2, it is desirable to maximize security and link budget while minimizing current consumption, latency, and system cost. Accordingly, in one example embodiment, the RF ranging system is based on an IR-UWB transceiver (e.g., using a protocol based on IEEE 802.15.4 HRP UWB). IR-UWB transceivers offer a means to support pulse radar functionality, with pulse transmitters, receivers that are designed to provide accurate estimates of the Channel Impulse Response (CIR), and the ability to support both transmit and receive functions using a single antenna 66.

With efficient Digital Signal Processor (DSP) algorithms, included for example in the controller 34, the link budget is primarily determined by receiver sensitivity, as the transmitter tends to be limited by the average or mean power spectral density regulations (e.g., −41.3 dBm/MHz for UWB devices under FCC Part 15 and/or ETSI EN 302 065).

In a traditional pulse radar using a gated mode, the receiver can be blind during transmission, meaning that a monostatic pulse radar, unlike its Continuous-Wave (CW) counterpart, need not reduce the receiver gain during signal reception due to signals from the transmitter reaching the receiver with large amplitudes (e.g., from direct transmitter to receiver feed-through coupling). This larger receiver gain afforded by the gated mode, results in better receiver sensitivity (e.g., it allows a pulse radar to achieve a larger link budget than a CW radar at equal average transmit power).

For an example embodiment of a short-range radar, receiver blindness is not allowed, as reflections of interest may (partially) overlap with (direct-feedthrough) signals from the transmitter appearing at the receiver. For example, with a typical UWB pulse shape, a typical pulse duration of approximately 10 ns would impose a blind time corresponding to approximately 1.5 meters round-trip time-of-flight (e.g., targets closer than 1.5 meters would not be detected, as shown by the radar blind range 72 of FIG. 2). This scenario is worse if blinding the receiver requires additional time for mode-switching, which is typically the case. A typical radar blind range 72 of several meters is common when mode-switching is considered in a gated mode RF ranging system. The embodiments described herein, alternate the mode of operation of a pulse radar between a gated (e.g., long-range) mode and a non-gated (e.g., short-range) mode. The characteristics of a gated mode and a non-gated mode radar system are compared in Table 1 below.

TABLE 1

Properties of Gated and Non-Gated modes

| Gated Pulse Radar Mode | Non-Gated Pulse Radar Mode |
| --- | --- |
| Low Pulse Repetition Frequency | High Pulse Repetition Frequency |
| High receiver gain −> | Reduced receiver Gain −> |
| High SNR | Reduced SNR |
| Blind at short range | Functional at short range |
| Trivial CIR de-convolution | DSP-intensive CIR de-convolution |
| Weak false alarm resistance | Strong false alarm resistance |
| Requires large pulse amplitudes to fill given mean power spectral mask | Requires large transmitter duty-cycle to fill given mean power spectral mask |

Example embodiments of RF ranging systems described herein adjust the relative durations of a gated mode and a non-gated mode (and in some embodiments, also a deactivated mode). Adjusting the relative durations of these modes occurs dynamically based on one or more of the following criteria. In one example embodiment, the relative duration (or duty cycle) of the gated and non-gated modes is adjusted based on the number of detected short-range targets relative to the number of long-range targets. For example, when a majority of the detected targets are short-range, additional time is allocated to a non-gate mode operation. In another example embodiment, the SNR margin of short-range targets relative to the SNR margin of long-range targets is used. The required SNR for short-range targets is typically less than for long-range targets because short-range targets reflect more signal power. In another example embodiment, a predefined ratio of gated mode duration and non-gated mode duration is defined for a programmed or set use case. For example, a radar used for gesture control prioritizes short-range detection of hand movements.

In another example embodiment, the target type or classification is inferred based on observed target characteristics, including but not limited to, reflected signal strength and relative movements between two or more detected targets or between a detected target and the RF transceiver. In another example embodiment, inferring target classifications or types include using machine learning and/or artificial intelligence.

Figure 3:
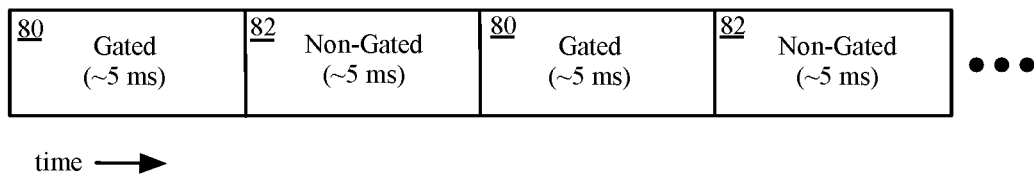
FIG. 3, FIG. 4 and FIG. 5 are timing diagram views showing sequential modes of operation of an impulse radar, in accordance with an example embodiment of the present disclosure.
Figure 4:
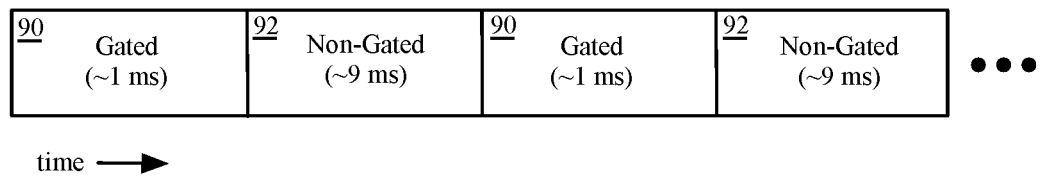
Figure 5:
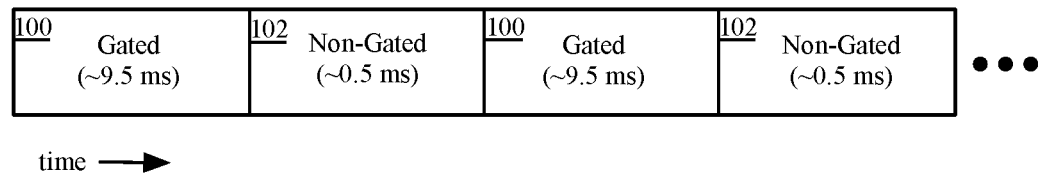

FIG. 3 to FIG. 5 shows the sequential modes of operation of an impulse radar, (e.g., for RF ranging) allocating the maximum time for radar transmission, in a repeating sequence of two modes. FIG. 3 to FIG. 5 also shows a "duty-cycle" optimization, where duty-cycle refers to the ratio of the gated modes to the non-gated modes. In FIG. 3 a gated mode 80 is interleaved with a non-gated mode 82, each with an equal duration (e.g., 5 ms). FIG. 4 shows an embodiment favoring short-range targets, at the expense of SNR for long-range targets. Here, the duration of the gated mode 90 (e.g., 1 ms) is less than the duration of the non-gated mode 92 (e.g., 9 ms). FIG. 5 shows an embodiment favoring long-range targets, at the expense of SNR for short-range targets. Here, the duration of the gated mode 100 (e.g., 9.5 ms) is greater than the duration of the non-gated mode 102 (e.g., 0.5 ms).

In one embodiment, the relative durations of the gated mode and the non-gated mode is dynamically adjusted based on a variety of criteria as discussed above. It should be appreciated that the durations of the gated modes, non-gated modes and deactivated modes of FIG. 3 to FIG. 5 are shown as example embodiments and not to limit the disclosure to other embodiments having different durations of the these modes.

Figure 6:
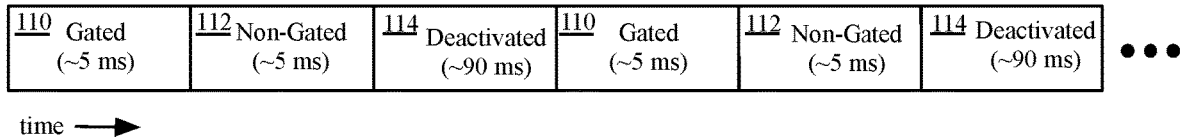
FIG. 6, FIG. 7 and FIG. 8 are timing diagram views showing sequential modes of operation of an impulse radar, in accordance with another example embodiment of the present disclosure.
Figure 7:
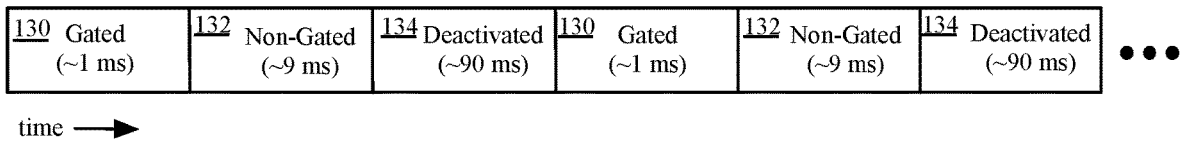
Figure 8:
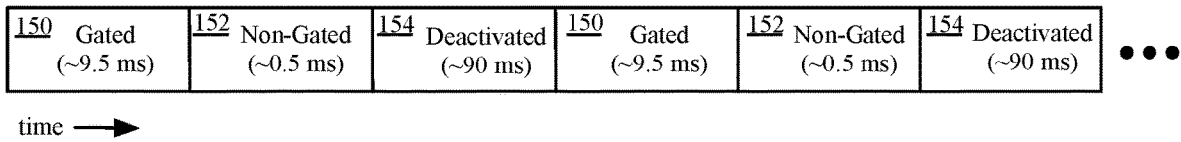

FIG. 6 to FIG. 8 shows the sequential modes of operation of an impulse radar, (e.g., for RF ranging) for a reduced energy operation, in a repeating sequence of three modes. In FIG. 6 a gated mode 110 is interleaved with a non-gated mode 112 and a deactivated mode 114. While both the gated mode 110 and non-gated modes 112 have an equal duration of 5 ms, (and thus equal weighting for long-range and short-range targets), the deactivated mode 114 is substantially longer at 90 ms to reduce energy consumption. In one embodiment, the deactivated mode 114 reduces energy consumption by deactivating the transceiver. FIG. 7 shows an embodiment favoring short-range targets, at the expense of SNR for long-range targets. Here, the duration of the gated mode 130 (e.g., 1 ms) is less than the duration of the non-gated mode 132 (e.g., 9 ms). Similar to FIG. 6, the deactivated mode 134 is substantially longer at 90 ms to reduce energy consumption. FIG. 8 shows an embodiment favoring long-range targets, at the expense of SNR for short-range targets. Here, the duration of the gated mode 150 (e.g., 9.5 ms) is greater than the duration of the non-gated mode 152 (e.g., 0.5 ms). Similar to FIG. 6, the deactivated mode 154 is substantially longer at 90 ms to reduce energy consumption.

In one embodiment, the relative durations of the gated mode and the non-gated mode are dynamically adjusted based on a variety of criteria as discussed above. It should be appreciated that the durations of the gated modes, non-gated modes and deactivated modes are shown as example embodiments and not to limit the disclosure to other embodiments having different durations of the these modes.

Figure 9:
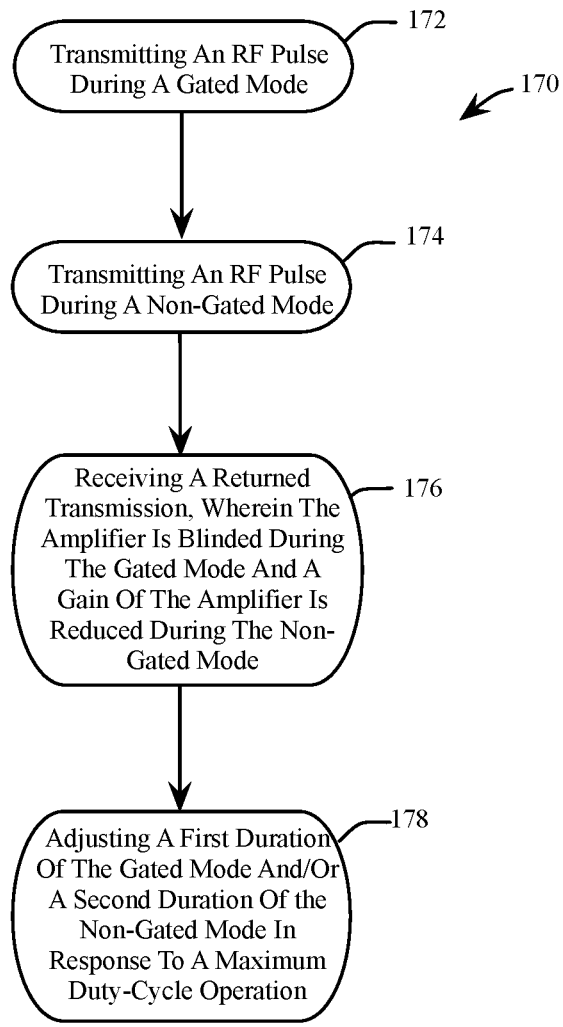
FIG. 9 is a flowchart representation of a method for operating an impulse radar using variable pulse repetition frequency, in accordance with an example embodiment of the present disclosure.

FIG. 9 with reference to FIG. 1 shows a method 170 for operating an impulse radar using variable pulse repetition frequency. At 172, an RF pulse is transmitted (e.g., with a transmitter 20), during a gated mode. At 174, an RF pulse is transmitted during a non-gated mode. At 176, a returned transmission is received (e.g., with a receiver 32). The amplifier of the receiver is blinded during the gated mode. A gain of the amplifier of the receiver is reduced during the non-gated mode. At 178, a first duration of the gated mode and/or a second duration of the non-gated mode (e.g., FIG. 3 to FIG. 5) is adjusted (e.g., with a controller 34), in response to a maximum duty-cycle operation.

Figure 10:
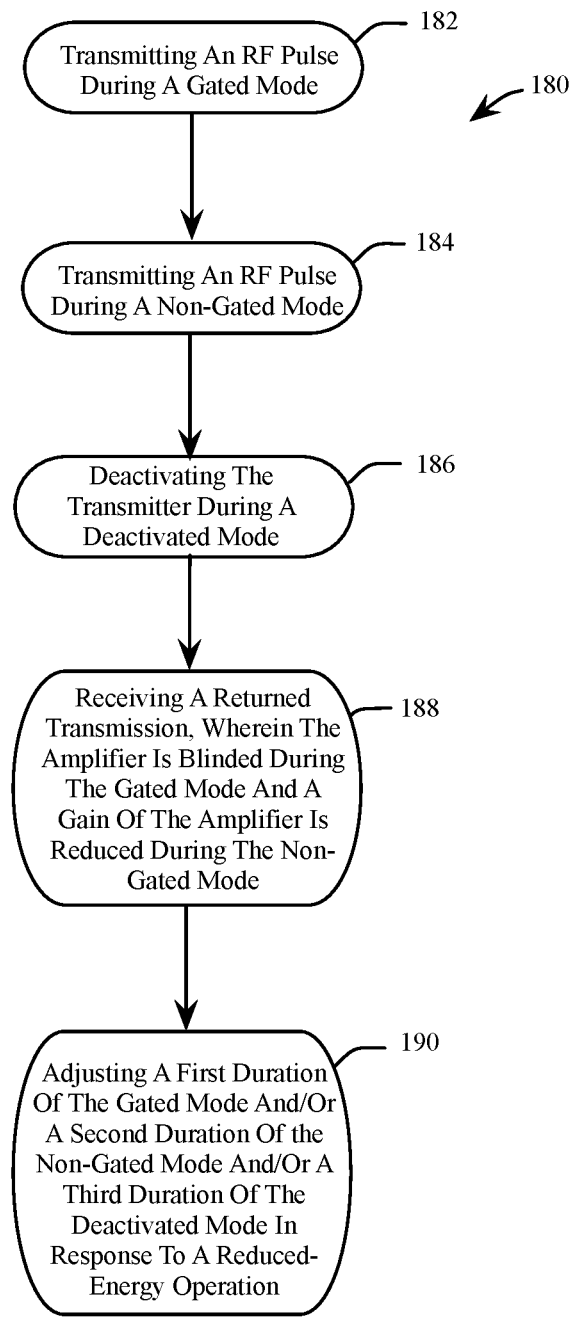
FIG. 10 is a flowchart representation of a method for operating an impulse radar using variable pulse repetition frequency, in accordance with an example embodiment of the present disclosure.

FIG. 10 with reference to FIG. 1 shows a method 180 for operating an impulse radar using variable pulse repetition frequency. At 182, an RF pulse is transmitted (e.g., with a transmitter 20), during a gated mode. At 184, an RF pulse is transmitted during a non-gated mode. At 186, the transmitter (e.g., transmitter 20) is deactivated. In another embodiment, the transceiver, including both the transmitter 20 and the receiver 32 is deactivated. At 188, a returned transmission is received (e.g., with a receiver 32). The amplifier of the receiver is blinded during the gated mode. A gain of the amplifier of the receiver is reduced during the non-gated mode. At 190, a first duration of the gated mode and/or a second duration of the non-gated mode and/or a third duration of the deactivated mode (e.g., FIG. 6 to FIG. 8) is adjusted (e.g., with a controller 34), in response to a reduced-energy operation.

As will be appreciated, embodiments as disclosed include at least the following. In one embodiment, an apparatus comprises a transmitter comprising a pulsed Radio Frequency (RF) source coupled to an antenna. A receiver comprises an amplifier coupled to the antenna. A controller is configured to adjust one or more durations of a ranging cycle of the apparatus, wherein the ranging cycle comprises a first duration of a gated mode and a second duration of a non-gated mode, the gated mode blinding the amplifier during a transmission of the transmitter, and the non-gated mode reducing a gain of the amplifier during the transmission.

Alternative embodiments of the apparatus include one of the following features, or any combination thereof. The ranging cycle further comprises a third duration of a deactivated mode, wherein the deactivated mode comprises deactivating the transmitter. The apparatus is temporally shared for a plurality of ranging applications. A passive target is capable of reflecting the transmission towards the antenna. An active target is configured to receive the transmission from the transmitter and to transmit a second transmission towards the antenna. The controller comprises machine-learning circuitry configured to identify a target classification of one or more targets within a range of the apparatus.

In another embodiment, a method for operating an impulse radar using variable pulse repetition frequency comprises transmitting a Radio Frequency (RF) pulse during a gated mode with a transmitter. The transmitter comprises an antenna. The RF pulse is transmitted during a non-gated mode with the transmitter. A returned transmission is received from at least one target with a receiver comprising blinding the amplifier while transmitting during the gated mode and reducing a gain of the amplifier while transmitting during the non-gated mode, wherein the receiver comprises an amplifier coupled to the antenna. At least one of a first duration of the gated mode and a second duration of the non-gated mode is adjusted in response to a maximum duty-cycle operation.

Alternative embodiments of the method for operating an impulse radar using variable pulse repetition frequency include one of the following features, or any combination thereof. The impulse radar is temporally shared for a plurality of targets. At least one of the first duration and the second duration is adjusted based on a detected first number of short-range targets and a detected second number of long-range targets. At least one of the first duration and the second duration is adjusted based on a required first Signal to Noise Ratio (SNR) margin of the at least one target being a short-range target and required second SNR margin of the at least one target being a large-range target. At least one of the first duration and the second duration is adjusted based on one or more predefined parameters. At least one of the first duration and the second duration is adjusted based on an inferred classification of the at least one target. The inferred classification of the at least one target is inferred using machine learning of a relative movement of the at least one target and another target.

In another embodiment, a method for operating an impulse radar using variable pulse repetition frequency comprises transmitting a Radio Frequency (RF) pulse during a gated mode with a transmitter. The transmitter comprises an antenna. The RF pulse is transmitted during a non-gated mode with the transmitter. The transmitter is deactivated during a deactivated mode. A returned transmission is received from at least one target with a receiver comprising blinding the amplifier while transmitting during the gated mode and reducing a gain of the amplifier while transmitting during the non-gated mode, wherein the receiver comprises an amplifier coupled to the antenna. At least one of a first duration of the gated mode, a second duration of the non-gated mode and a third duration of the deactivated mode is adjusted in response to a reduced-energy operation.

Alternative embodiments of the method for operating an impulse radar using variable pulse repetition frequency include one of the following features, or any combination thereof. The impulse radar is temporally shared for a plurality of targets. At least one of the first duration and the second duration is adjusted based on a detected first number of short-range targets and a detected second number of long-range targets. At least one of the first duration and the second duration is adjusted based on a required first Signal to Noise Ratio (SNR) margin of the at least one target being a short-range target and required second SNR margin of the at least one target being a large-range target. At least one of the first duration and the second duration is adjusted based on one or more predefined parameters. At least one of the first duration and the second duration is adjusted based on an inferred classification of the at least one target. The inferred classification of the at least one target is inferred using machine learning of a relative movement of the at least one target and another target.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising:
   a transmitter comprising an impulse Radio Frequency (RF) source coupled to an antenna;
   a receiver comprising an amplifier coupled to the antenna; and
   a controller configured to adjust one or more durations of a ranging cycle of the apparatus based on ranges of targets detected in one or more earlier ranging cycles, wherein the ranging cycle comprises a first duration of a gated mode and a second duration of a non-gated mode, the gated mode blinding the amplifier by gating an output of the amplifier during a transmission of impulses at a first repetition frequency to detect targets in a first range, and the non-gated mode reducing a gain of the amplifier during the transmission of impulses at a second repetition frequency to detect targets in a second range less than the first range, wherein the first repetition frequency is less than the second repetition frequency, an amplitude of the impulses transmitted at the first repetition frequency being sized based on a mean power spectral mask, and a duty cycle of the impulses transmitted at the second frequency being sized based on the mean power spectral mask.

2. The apparatus of claim 1 wherein the ranging cycle further comprises a third duration of a deactivated mode, wherein the deactivated mode comprises deactivating the transmitter and the receiver between the first duration and the second duration.

3. The apparatus of claim 1 wherein the apparatus is temporally shared for a plurality of ranging applications.

4. The apparatus of claim 1 further comprising a passive target capable of reflecting the transmission towards the antenna.

5. The apparatus of claim 1 further comprising an active target configured to receive the transmission from the transmitter and to transmit a second transmission towards the antenna.

6. The apparatus of claim 1 wherein the controller comprises machine-learning circuitry configured to identify a target classification of one or more targets within a range of the apparatus.

7. The apparatus of claim 1, wherein the gated mode comprises transmitting pulses with a first amplitude and first frequency to detect long range targets and the non-gated mode comprises transmitting pulses with a second amplitude and second frequency to detect short range targets, wherein the first amplitude is higher than the second amplitude and the first frequency is less than the second frequency.

8. The apparatus of claim 1, wherein the first duration is longer than the second duration when a number of short range targets in the one or more earlier ranging cycles is less than a number of long range targets.

9. The apparatus of claim 1, wherein the controller configured to adjust one or more durations of the ranging cycle of the apparatus comprises one of adjusting the durations based the ranges of targets detected in one or more earlier ranging cycles, reflected signal strength from targets, and relative movement between targets.

10. The apparatus of claim 1, wherein blinding the amplifier comprises one of disabling the amplifier and gating the output of the amplifier.

11. A method for operating an impulse radar using variable pulse repetition frequency comprising:
    transmitting an impulse Radio Frequency (RF) pulse during a gated mode with a transmitter, the transmitter comprising an antenna;
    transmitting the RF pulse during a non-gated mode with the transmitter;
    receiving a returned transmission from at least one target with a receiver comprising blinding an amplifier by gating an output of the amplifier while transmitting impulses at a first repetition frequency during the gated mode to detect targets in a first range and reducing a gain of the amplifier while transmitting impulses at a second repetition frequency to detect targets in a second range less than the first range during the non-gated mode, wherein the receiver comprises the amplifier coupled to the antenna, wherein the first repetition frequency is less than the second repetition frequency, an amplitude of the impulses transmitted at the first repetition frequency being sized based on a mean power spectral mask, and a duty cycle of the impulses transmitted at the second frequency being sized based on the mean power spectral mask; and
    adjusting at least one of a first duration of the gated mode and a second duration of the non-gated mode in ranging cycles based on ranges of targets detected in one or more earlier ranging cycles.

12. The method of claim 11 further comprising temporally sharing the impulse radar for a plurality of targets.

13. The method of claim 11 further comprising adjusting at least one of the first duration and the second duration based on a detected first number of short-range targets and a detected second number of long-range targets.

14. The method of claim 11 further comprising adjusting at least one of the first duration and the second duration based on a required first Signal to Noise Ratio (SNR) margin of the at least one target being a short-range target and required second SNR margin of the at least one target being a large-range target.

15. The method of claim 11 further comprising adjusting at least one of the first duration and the second duration based on one or more predefined parameters.

16. The method of claim 11 further comprising adjusting at least one of the first duration and the second duration based on an inferred classification of the at least one target.

17. The method of claim 16 further comprising inferring the inferred classification of the at least one target using machine learning of the relative movement of the at least one target and another target.

18. The method of claim 11, wherein the gated mode comprises transmitting pulses with a first amplitude and first frequency to detect long range targets and the non-gated mode comprises transmitting pulses with a second amplitude and second frequency to detect short range targets, wherein the first amplitude is higher than the second amplitude and the first frequency is less than the second frequency.

19. The method of claim 11, wherein the first duration is longer than the second duration when a number of short range targets in the one or more earlier ranging cycles is less than a number of long range targets.

20. The method of claim 11, wherein adjusting at least one of the first duration of the gated mode and the second duration of the non-gated mode in ranging cycles comprising adjusting at least one of the first duration of the gated mode and the second duration of the non-gated mode in ranging cycles based on ranges of targets detected in one or more earlier ranging cycles, reflected signal strength from targets, and relative movement between targets.

21. The method of claim 11, wherein blinding the amplifier comprises one of disabling the amplifier and gating the output of the amplifier.

* * * * *